Sept. 8, 1959  C. E. SMITH ET AL  2,902,913
RANGE FINDER FOR PHOTOGRAPHIC CAMERAS
Original Filed Dec. 12, 1950  2 Sheets-Sheet 1

INVENTOR.
CLARENCE E. SMITH,
HUBERT NERWIN
BY AND MILFORD B. MOORE

ATTORNEY

Sept. 8, 1959 C. E. SMITH ET AL 2,902,913
RANGE FINDER FOR PHOTOGRAPHIC CAMERAS
Original Filed Dec. 12, 1950 2 Sheets-Sheet 2

INVENTOR.
CLARENCE E. SMITH,
HUBERT NERWIN,
BY AND MILFORD B. MOORE

ATTORNEY

United States Patent Office 2,902,913
Patented Sept. 8, 1959

2,902,913

RANGE FINDER FOR PHOTOGRAPHIC CAMERAS

Clarence E. Smith, Rochester, Hubert Nerwin, Irondequoit, and Milford B. Moore, Brighton, N.Y., assignors to Graflex, Inc., Rochester, N.Y., a corporation of Delaware Original application December 12, 1950, Serial No. 200,414, now Patent No. 2,693,744, dated November 9, 1954. Divided and this application December 29, 1953, Serial No. 400,868

5 Claims. (Cl. 95—44)

The present invention relates to range finders and more particularly to coupled range finders for photographic cameras. The present application is a division of our pending application, Serial No. 200,414, filed December 12, 1950, now Patent No. 2,693,744, granted November 9, 1954.

It is common practice to attach a range finder to a camera so that the camera may properly be focused upon the object which is to be photographed. Conventional attached range finders have two mirrors disposed vertically one above the other, the upper mirror being fixed and being of the semi-transparent type, and the lower mirror being rotatable and being coupled to the lens board, or support for the front lens of the camera, so that when the lens board or support is moved in or out along the camera bed the lower mirror is swung on its axis of rotation. The user, upon looking into the eye piece of the range finder, sees two images of the object to be photographed, one reflected from the lower mirror and the rear face of the upper mirror, and the other visible directly through the transparent upper mirror. By adjusting the lens board or support of the camera forward or back these two images may be brought together, and when this is done the camera is in proper focus.

To rotate the lower mirror upon adjustment of the lens board or support, complicated lever systems are required in conventional attached range finders. These add to the cost of the range finder and increase the likelihood of the range finder getting out of adjustment.

Moreover, it has heretofore been the practice to mount the mirrors directly on the casing of the rangefinder and to secure that casing directly to the box or housing of the camera. As a result, expansion or contraction of the camera housing or of the rangefinder casing affects the mirror position, introducing errors which can affect the precision of focusing of the camera.

In conventional range finders, also, it is always difficult to position both mirrors so that they may lie in parallel planes. If the plane of one mirror is slightly tilted with reference to the plane of the other mirror, however, side image will be caused. This is always confusing and obstructs efficient use of the rangefinder.

One object of the invention, insofar as the present application is concerned, is to provide a rangefinder which will be much simpler in construction than prior known rangefinders.

Another object of the invention is to provide a rangefinder attachment for photographic cameras in which the lower mirror is fixed and the upper transparent mirror is made rotatable.

A still further object of the invention is to provide a mounting for the fixed mirror which will permit of readily adjusting the plane of that mirror to be parallel to the plane of the rotatable mirror thereby to avoid side image.

Still other objects of the invention are to provide a rangefinder for attachment to a photographic camera which will be more durable than conventional range finders and more stable, thereby insuring greater accuracy and longer life.

Other objects of the invention will be apparent hereinafter from the specification and from the recital of the appended claims.

Figure 1:
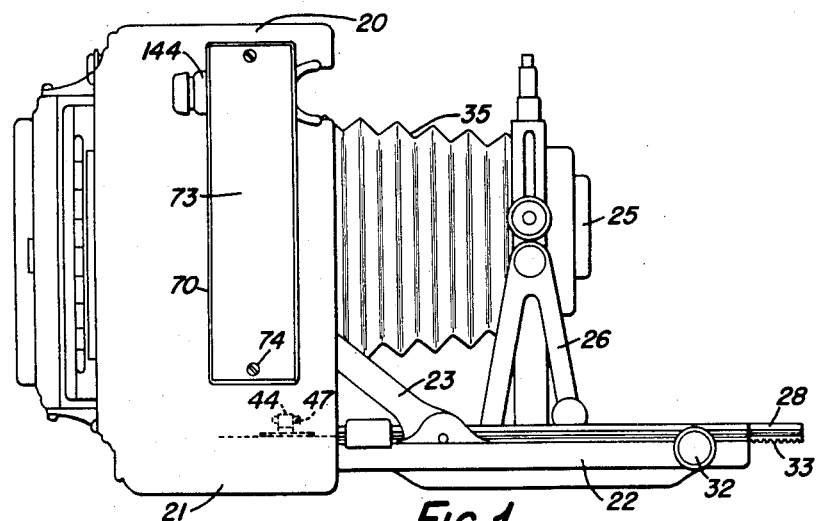
Fig. 1 is a side elevation of a camera in open position and showing attached thereto a rangefinder constructed according to one embodiment of this invention.

Referring now to the drawings by numerals of reference, 20 denotes the case or box of a conventional camera, and 22 denotes the bed of this camera. This bed is hinged to the camera box or casing 20 and is held in operative position by side arms 23.

The objective or front lens 25 of the camera is mounted in conventional manner by means of brackets 26 in a slide (not shown) (Fig. 1) which is adapted to be clamped in conventional manner to a pair of rails 28. The rails 28 are mounted to slide in the camera box 20 and on the bed 22. The rails 28 are adjusted as usual by a focusing knob 32. This knob carries pinions (not shown) which engage racks 33 formed on the under side of the rails 28. The camera objective 25 is connected at one end to the bellows 35 of the camera in conventional manner. Only one rail 28 is shown in the drawings of the present application but in conventional manner there are two parallel rails 28.

Connected to one of the rails 28, as described more in detail in our parent application, Serial No. 200,414, abovementioned, is a bracket 44 on which is mounted an adjustable screw or follower 47. This screw or follower actuates the coupling mechanism which connects the lens board of the camera to the rotatable reflector or mirror of the rangefinder, to move this mirror or reflector as the lens is adjusted in focusing the camera. The coupling mechanism may be constructed as described in our parent application above-mentioned, or may be of any suitable type, insofar as the invention herein claimed is concerned.

Figures 2, 3, 4:
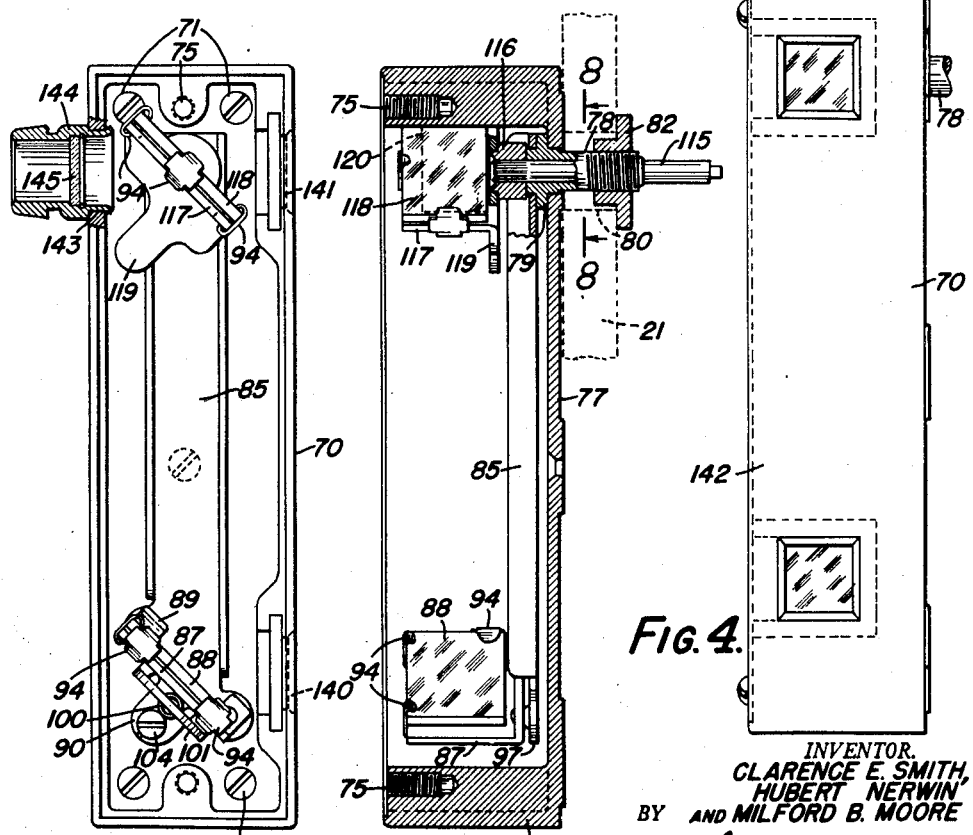
Fig. 2 is a view on an enlarged scale of the range finder with the outside cover of the rangefinder removed and with parts shown in section.
Fig. 3 is a section through the rangefinder taken at right angles to the view of Fig. 2.
Fig. 4 is a front elevation of the rangefinder.

The rangefinder itself is housed within a casing 70 (Figs. 1, 2, 3 and 4) which is secured to the outside of the wall 21 of the camera case or box 20 by screws 71 (Fig. 2). The casing is rectangular in shape. Access may be had to its interior by removing the lid or cover 73. This lid or cover is secured in position at one side of the casing by screws 74 that thread into holes 75 in the casing walls.

Figure 8:
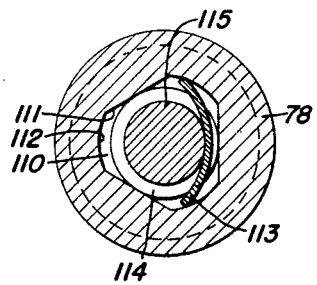
Fig. 8 is a section on the line 8—8 of Fig. 3 looking in the direction of the arrows and on an enlarged scale.

Mounted in that side wall 77 of the rangefinder casing 70, which is contiguous to the side wall 21 of camera casing 20, is a bolt or bearing member 78 (Figs. 3 and 8). The shank of this bolt or bearing member is externally threaded for part of its length. It is adapted to pass through a hole in the wall 77 of the rangefinder casing and through an aligned hole 80 in the vertical side wall 21 of the camera case. The head 79 of the bolt seats against the inside face of the wall 77 of the casing 70. A nut 82 threads onto the shank of the bolt inside the camera case to hold the head of the bold tight in the rangefinder casing and in the camera box.

Silver-soldered or otherwise secured to the bearing member 78 is a beam 85 which is U-shaped in cross-section. Mounted upon this beam at the free end thereof is a support or bracket 87 which carries a mirror or reflector 88.

Figure 5:
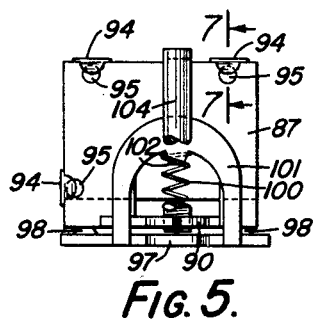
Figs. 5 and 6 are detail views taken at right angles to one another and showing the mounting of the lower mirror of the range finder.
Figure 6:
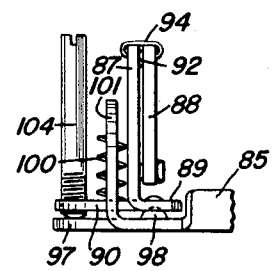
Figure 7:
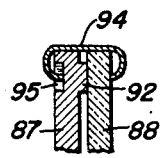
Fig. 7 is a fragmentary section taken on lines 7—7 of Fig. 5 looking in the direction of the arrows and showing the manner and means by which each mirror is secured to its mounting.

The bracket or support comprises a metallic stamping which extends in back of the mirror 88. This support is formed at its base with two forwardly-extending seating portions 89 (Figs. 2 and 6), and has a rearwardly projecting part 90 which is stamped out of the back portion of the sheet and bent down to lie substantially in the plane of the supporting lugs 89. The back portion of the support 87 is coined at three spaced points to form three spaced forwardly-projecting seating bosses 92 (Fig. 7). The mirror 88 is secured to the support 87 by three U-shaped spring clips 94 (Figs. 2, 5 and 7), each of which has its free ends bent inwardly toward one another. The spring clips are adapted to be engaged over the contiguous edge surfaces of the mirror and its support with the end of one leg of each clip engaging the front face of the mirror and the end of the other leg of each clip seating in a recess 95 formed in the back of the support 87 by the coining of a seat 92. The mirror is thus mounted with a three-point bearing upon the support 87 and held to the support under spring tension. Moreover, the clips 94 apply the spring pressure, which holds the mirror on the support, directly in line with the seats 92. A mounting is thereby provided for the mirror which will not transmit strains to the mirror. At the same time, a mounting is provided which permits the mirror to be easily and quickly assembled on its support. No cementing of the mirror to the support is required; and the mess and cost of a cementing operation are obviated.

The support 87 itself is mounted for tiltable adjustment on the U-shaped beam member 85. The side walls of this member are cut away near the outer end thereof to leave only a projecting tongue 97 (Figs. 5 and 6) on which the support 87 is carried. This projecting portion 97 is formed with two hemispherical bosses 98, which are laterally aligned, and which seat in hemispherical sockets stamped in the supporting lugs 89 of support 87. A coil spring 100 is interposed between the rearwardly projecting portion 90 of the support 87 and an arched yoke portion 101 stamped up from the extension 97 of the base portion of beam member 85. The spring is held at its upper end by a lug 102 formed on the center of the arch of yoke member 101. The spring tends to rock the support 87 counterclockwise on the bosses 98, as viewed in Fig. 6. A screw 104, which threads into the rearwardly projecting portion 90 of the support 87 and which engages the top face of the extension 97 of the beam member 85 serves for adjustment of the support 87 angularly on the beam member 85. This adjustment is an adjustment useful in manufacture and assembly of the range-finder, permitting the plane of the mirror 88 to be positioned so as to eliminate side image.

The bolt or bearing member 78 is bored to have a generally hexagonal shaped bore, as shown in Fig. 8. This bore has three equi-angularly-spaced, generally plane portions 111 and three alternating equi-angularly spaced concave portions 112. Journaled in the bore 110 of the bearing member 78 is a shaft 115 (Fig. 3). This shaft extends at its outside end through the bolt 78 into the range finder casing 70. Splined and soldered to the end of the shaft, which is inside the casing 70, is a collar 116 and brazed or soldered to this collar 116 is a support 117 for the semi-transparent mirror 118.

This support 117 is formed with a rearwardly bent fan tail portion 119. The mirror 118 is secured to the support 117 by three spring clips 94 which may be identical in construction with the spring clips 94 previously described and which engage at their front ends with the face of the mirror and seat at their rear ends in sockets formed by stamping the support 117 to provide bosses, similar to those of the mirror support 87, against which mirror 118 seats. The mirror support 117 is cut away, as shown in dotted lines 120 in Fig. 3, to permit light to pass through the mirror to the eye-piece of the range finder.

The shaft 115 is held in engagement with two spaced plane portions 111 of the bore 110 of bolt 78 by an arcuate leaf spring 113 which seats in a peripheral recess 114 formed in the shaft 115, and which is thereby held against axial movement relative to the shaft. This spring seats at opposite ends against two of the arcuate portions 112 of the bore 110. The spring holds the shaft against two of the plane side portions 111 of the bore 110 and serves itself as the third bearing for the shaft, thus providing a three point bearing mounting for the shaft. This bearing mounting prevents play between the shaft and the bore of bolt 78, and provides a much more accurate mounting for the shaft than would be possible were the bolt provided simply with a cylindrical bore matched as closely as possible in internal diameter to the external diameter of the shaft. No matching is here required and a better mounting results.

The shaft 115 projects at its inside end through the bolt 78 into the camera box. This inside end of the shaft is connected through the coupling mechanism of the camera to the adjustable screw or follower 47 (Fig. 1) as described in our parent application above-mentioned, so that, as the lens board is adjusted in focusing, the shaft 115 will be rotated and transmit its rotation to reflector 118. Through the follower 47, coupling mechanism, and shaft 115, the semi-transparent mirror 118 can be made to track relative to the objective lens of the camera so that as the camera is focused the mirror 118 will move correctly as required for the rangefinding operation. By adjustment of follower 47, as described in our parent application above mentioned, the rangefinder can be adjusted to be used with different objective lenses in the camera.

The rangefinder casing 70 is completely sealed against passage of light except for the two window openings 140 and 141 (Fig. 2) in its front wall 142 (Fig. 4) and the opening 143 in its rear wall in which the eye piece 144 is mounted. The eye piece is of conventional construction and includes the eye glass or lens 145.

With the construction of the present invention simplicity, accuracy and low-cost are achieved. Thus, the three point mountings for the mirrors 88 and 118 by means of the spring clips 94 hold the mirrors securely without transmitting strain to them, and establish the plane of each mirror. Each mirror is clipped over the points of its location directly by the three spring clips. The mirrors 118 and 88 carried by shaft 115 and beam 85, respectively, are thereby mounted to be free of the effect of any distortion of the range finder case. The beam is furthermore secured at one end to a bolt 78 which serves not only as a bearing for shaft 115 but passes through the rangefinder case 70 and the camera case 20 to hold the two cases between the beam and the nut 82 that threads onto the bolt. The beam, moreover, can be made of annealed steel because of the simple shape employed. This further increases the rigidity of the construction thereby increasing the accuracy of the rangefinder.

While the invention has been described in connection with a specific embodiment thereof it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A rangefinder for use on a camera comprising a casing having two windows in its front wall, an observation window, a bolt for securing said casing to the camera, a rigid, elongate beam rigidly fastened at one end to said bolt within the casing but being otherwise free of the casing, said bolt being hollow, a shaft journaled in said bolt, a reflector secured to said shaft within said casing in register with one of said two front windows, and a second reflector mounted on said beam adjacent the other end of said beam in register with the other of said two front windows, one of said reflectors being semi-transparent and registering with said observation window, said reflectors being so positioned relative to one another that light falling on the other reflector is reflected by said other reflector onto said semi-transparent reflector.

2. A rangefinder for use on a camera comprising a casing having two windows in its front wall, an observation window, a bolt for securing said casing to the camera, a rigid, elongate beam rigidly fastened at one end to said bolt within the casing but being otherwise free of the casing, said bolt having a polygonal bore, at least two sides of which are plane, a shaft journaled in said bore, resilient means holding said shaft against two plane sides of the bore, a semi-transparent reflector secured to said shaft within said casing in register with one of said two front windows and with said observation window, and a second reflector mounted on said beam adjacent the other end of said beam in register with the other of said two front windows to reflect light from said other window onto said semi-transparent reflector.

3. A rangefinder for use on a camera comprising a casing having two windows in its front wall, an observation window, a bolt for securing said casing to the camera, a rigid, elongate beam rigidly fastened at one end to said bolt within the casing but being otherwise free of the casing, said bolt having a polygonal bore at least two sides of which are plane and at least two sides of which are concave, a shaft journaled in said bore, a leaf spring seated at opposite ends against said two concave sides of the bore and bearing intermediate its ends against said shaft to press said shaft against said two plane sides of the bore, a semi-transparent reflector secured to said shaft within said casing in register with one of said two front windows and with said observation window, and a second reflector mounted on said beam adjacent the other end of said beam in register with the other of said two front windows to reflect light from said other window onto said semi-transparent reflector.

4. A rangefinder for use on a camera comprising a casing having two windows in its front wall, an observation window, a bolt for securing said casing to the camera, said bolt having a polygonal bore at least two sides of which are plane and at least two sides of which are concave, a shaft journaled in said bore, a leaf spring seated at opposite ends against said two concave sides of the bore and bearing intermediate its ends against said shaft and pressing said shaft against said two plane sides of the bore, a semi-transparent reflector secured to said shaft within said casing in register with one of said two front windows and with said observation window, and a second reflector mounted in said casing in register with the other of said two front windows, said second reflector being positioned relative to said semi-transparent reflector to reflect light from said other window onto said semi-transparent reflector.

5. A rangefinder for use on a camera which has an objective lens that is adjustable for focusing, comprising a casing having two windows fixed in its front wall disposed vertically one above the other, an observation window fixed in its rear wall in alignment with the upper front window, a bolt for securing said casing to the camera, a rigid, elongate beam rigidly fastened at on end to said bolt within the casing but being otherwise free of the casing, said bolt being hollow, a shaft journaled in said bolt, a semi-transparent reflector secured to said shaft within the casing in register with said upper front window and with said observation window for rotary movement with said shaft, and a relatively fixed reflector mounted on said beam adjacent the other end of said beam in register with the lower of said two front windows to reflect light from said other window onto said semi-transparent reflector.

References Cited in the file of this patent

UNITED STATES PATENTS

| | | |
|---|---|---|
| 2,058,484 | Mihalyi | Oct. 27, 1936 |
| 2,242,452 | Cazin | May 20, 1941 |
| 2,245,158 | Phillips et al. | June 10, 1941 |
| 2,261,421 | Steiner | Nov. 4, 1941 |
| 2,267,811 | Brownscombe | Dec. 30, 1941 |
| 2,373,406 | Luboshez | Apr. 10, 1945 |
| 2,376,982 | Schwartz et al. | May 29, 1945 |
| 2,575,166 | Dunaway et al. | Nov. 13, 1951 |
| 2,611,296 | Pribus | Sept. 23, 1952 |
| 2,627,779 | Szelwach | Feb. 10, 1953 |